United States Patent
Sundström et al.

(10) Patent No.: US 10,080,146 B2
(45) Date of Patent: Sep. 18, 2018

(54) ANTENNA BEAM CONTROL

(71) Applicant: Telefonaktiebolaget L M Ericsson (publ), Stockholm (SE)

(72) Inventors: Lars Sundström, Södra Sandby (SE); Daniel Araújo, Fortaleza (BR); Dennis Hui, Sunnyvale, CA (US); Andres Reial, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1055 days.

(21) Appl. No.: 14/206,120

(22) Filed: Mar. 12, 2014

(65) Prior Publication Data

US 2015/0264583 A1   Sep. 17, 2015

(51) Int. Cl.
| | |
|---|---|
| H04W 16/28 | (2009.01) |
| H04W 64/00 | (2009.01) |
| H04B 7/06 | (2006.01) |
| H04B 7/08 | (2006.01) |

(52) U.S. Cl.
CPC .......... *H04W 16/28* (2013.01); *H04B 7/0617* (2013.01); *H04B 7/086* (2013.01); *H04W 64/006* (2013.01)

(58) Field of Classification Search
CPC ..... H04W 16/28; H04W 64/006; H04B 7/086
USPC ........................................ 342/373
See application file for complete search history.

(56) References Cited

U.S. PATENT DOCUMENTS

| | | | | |
|---|---|---|---|---|
| 5,051,751 A | * | 9/1991 | Gray | ................. H03H 17/0257 342/107 |
| 2001/0022558 A1 | * | 9/2001 | Karr, Jr. | ................. G01S 1/026 342/450 |
| 2003/0236096 A1 | | 12/2003 | Yamazaki et al. | |
| 2004/0017310 A1 | * | 1/2004 | Vargas-Hurlston | ......................... H04W 64/006 342/357.4 |
| 2007/0057843 A1 | * | 3/2007 | Chang | .................. H01Q 3/2605 342/368 |
| 2008/0150798 A1 | * | 6/2008 | Curry | ...................... H01Q 1/18 342/359 |
| 2008/0238703 A1 | * | 10/2008 | Rofougaran | ...... H04W 72/0406 340/670 |
| 2009/0046006 A1 | | 2/2009 | Inagaki et al. | |

(Continued)

FOREIGN PATENT DOCUMENTS

| | | |
|---|---|---|
| EP | 2637250 A2 | 9/2013 |
| WO | 2009041759 A1 | 4/2009 |

(Continued)

OTHER PUBLICATIONS

Azordegan, et al., "Studying the Effects of High Order Roots of Array Factor Polynomial on Phased Array's Beamwidth." IEEE ISCIT 2006. 910-915.

(Continued)

*Primary Examiner* — Harry K Liu
(74) *Attorney, Agent, or Firm* — Murphy, Bilak & Homiller, PLLC

(57) ABSTRACT

Spatial sensor data, such as position, movement and rotation, which is provided by a sensor in a wireless communication device in a wireless communication system is used. By using the spatial sensor data it is possible to calculate predicted spatial data for use in controlling antenna beams for transmission as well as reception in the wireless communication system.

26 Claims, 5 Drawing Sheets

(56) References Cited

U.S. PATENT DOCUMENTS

2012/0169539 A1* 7/2012 Huang .................... H01Q 3/26
  342/372
2013/0059620 A1 3/2013 Cho
2014/0379292 A1* 12/2014 Ara ......................... A61B 5/11
  702/141

FOREIGN PATENT DOCUMENTS

WO      2013022161 A1    2/2013
WO      2013023187 A1    2/2013
WO   WO 2015090353 A1 *  6/2015  ........... H04B 7/0408

OTHER PUBLICATIONS

Sayidmarie, et al., "Synthesis of Wide Beam Array Patterns Using Quadratic-Phase Excitations." International Journal of Electromagnetics and Applications 2013. 127-135.

Zaman, et al., "Phased Array Synthesis Using Modified Particle Swarm Optimization." Journal of Engineering Science and Technology Review 4 (1), 2011. 68-73.

* cited by examiner

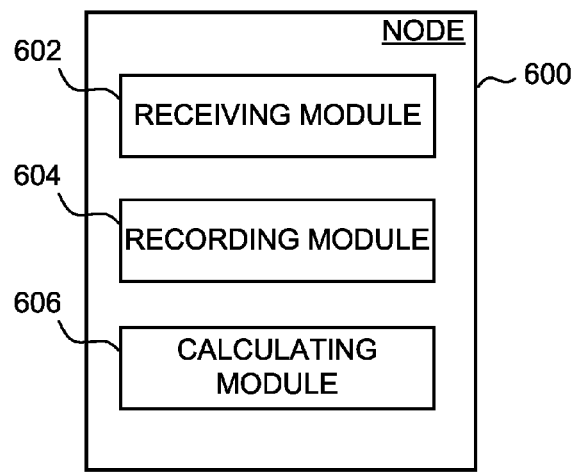
*Fig. 6*
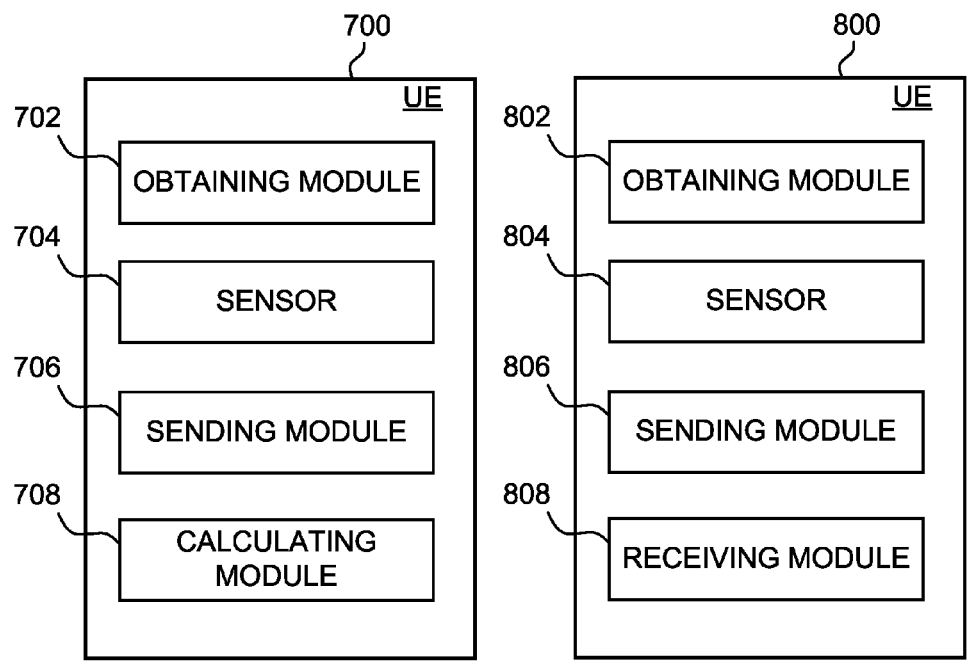
*Fig. 7*   *Fig. 8*

ANTENNA BEAM CONTROL

TECHNICAL FIELD

Embodiments herein relate to antenna beam control in a wireless communication system. A method in a node and methods in a wireless device are disclosed together with corresponding apparatuses and computer readable storage media as well as a system.

BACKGROUND

Current and future high frequency, e.g. millimetre wave, radio access technology (RAT) communication between nodes such as a radio base station and wireless communication devices, such as user equipment (UE), will heavily rely on antenna beam-forming (i.e. beam direction control and/or beam shape control). A reason for this is that it is desirable to attain acceptable path loss because of the typically small apertures of single antennas at the high radio frequencies involved, but also to compensate for the progressively reduced power capability of power amplifiers and increased noise figure of receivers as the frequency of operation is increased. Moreover, support for device-to-device (D2D) communication between several wireless communication devices using such high frequency RAT is an even more challenging problem as the need for beam forming is still valid while the wireless devices are often not stationary but moving.

However, it is to be noted that beam-forming involving narrow antenna beams leads to requirements on participating nodes or devices to be able to accurately track the antenna beams in order not to become a victim of the desired selectivity. That is, participating entities not being able to "see" each other due to misdirected antenna beams. This can be a severe problem even when participating nodes and/or devices move slowly in relation to each other in case the beams are very narrow.

In conventional prior art, beam tracking mechanisms are typically based on measurements using the transmission link between a radio base station (RBS) and a UE. Changes in received signal strength or signal to interference and noise ratio (SINR) metrics are used to identify the desired beam movement direction. However, a problem existing in conventional solutions is that the movement of UEs may be too fast to correct for in the UE only by tracking using measurements of received signal strength because these individual measurements are often noisy and need temporal smoothing. Needless to say, in a D2D scenario, there are two or more UEs communicating directly with each other while moving, which then aggravates the problem further.

SUMMARY

An object of the present disclosure is to at least mitigate some of the drawbacks in the prior art. Hence, in view of the above, there is provided in one aspect, a method performed by a node of a wireless communication system, for performing an iterative process. The iterative process comprises receiving, from a first wireless communication device, spatial sensor data relating to the first wireless communication device. The received data is recorded such that a time sequence of historical and current spatial sensor data relating to the first wireless communication device is maintained. Data of the time sequence of historical and current spatial sensor data relating to the first wireless communication device is used in a calculation of predicted spatial data for use in controlling at least one antenna beam in the wireless communication system.

In another aspect there is provided a method performed by a first wireless communication device of a wireless communication system, for performing an iterative process. The iterative process comprises obtaining, from at least one sensor in the first wireless communication device, spatial sensor data relating to the first wireless communication device. The obtained spatial sensor data relating to the first wireless communication device is sent to a node in the wireless communication system. Data of the time sequence of historical and current spatial sensor data relating to the first wireless communication device is used in a calculation of predicted spatial data for use in controlling at least one antenna beam in the first wireless communication device.

In yet another aspect there is provided a method performed by a first wireless communication device of a wireless communication system, for performing an iterative process. The iterative process comprises obtaining, from at least one sensor in the first wireless communication device, spatial sensor data relating to the first wireless communication device. The obtained spatial sensor data relating to the first wireless communication device is sent to a node in the wireless communication system. Predicted spatial data is received from the node, for use in controlling at least one antenna beam in the first wireless communication device.

In further aspects there are provided a node, wireless communication devices, a system, a computer program and a carrier. These aspects correspond to the method aspects as summarized above.

By utilizing spatial data provided by a sensor in the wireless communication device it is possible to mitigate drawbacks related to the fact that the movement of the wireless communication device may be too fast to correct for in the wireless communication device by tracking using measurements of received signal strength. As will be exemplified in embodiments described in the following detailed description, this general advantage is reflected in a similar way in all these aspects.

DETAILED DESCRIPTION

Figure 1:
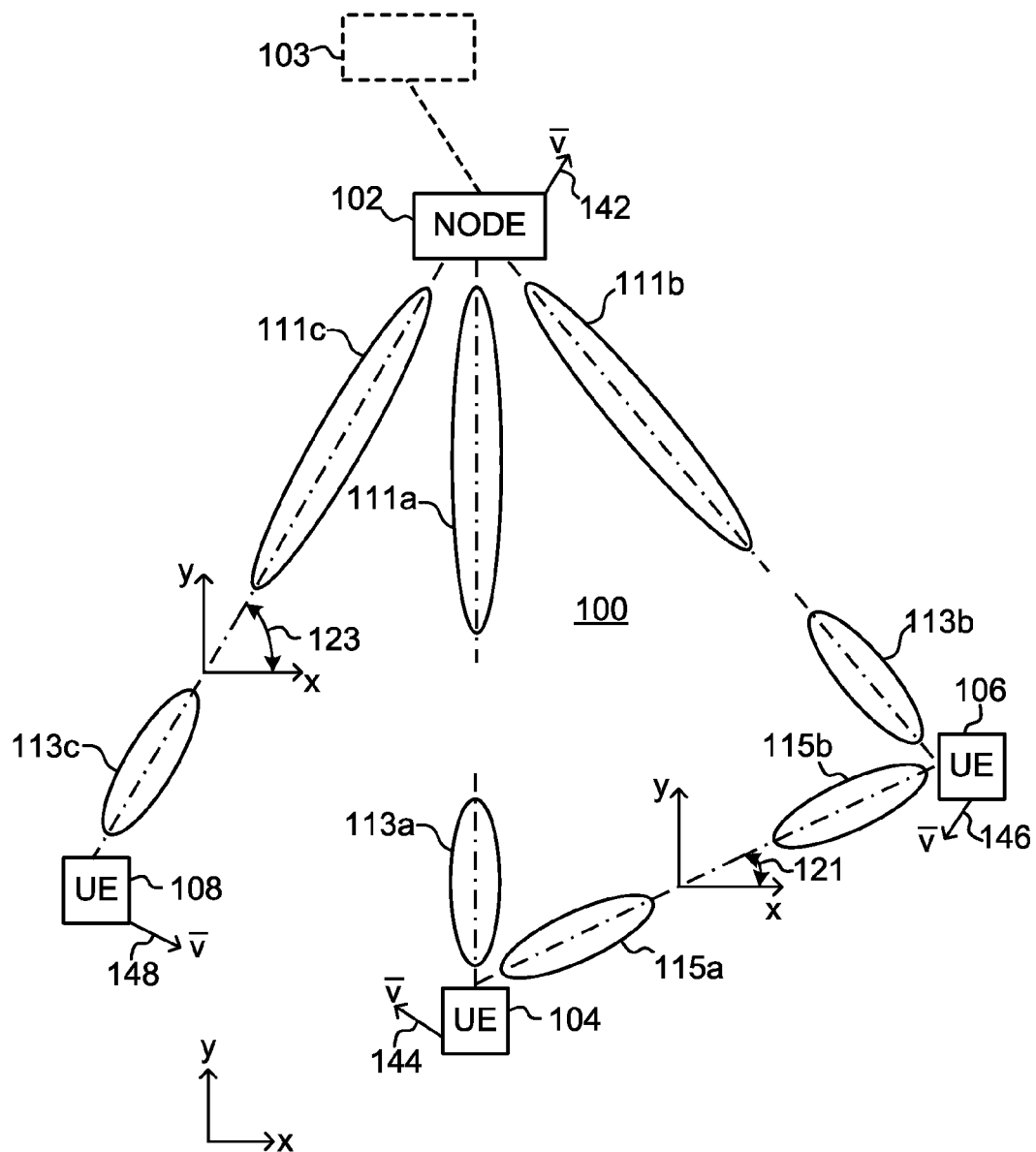
FIG. 1 schematically illustrates a wireless communication system.

FIG. 1 illustrates schematically an exemplifying wireless communications system 100 in which embodiments herein may be implemented. The wireless communications system 100 may be any third generation partnership project (3GPP) wireless communication system, such as a Universal Mobile Telecommunication System (UMTS) Wideband Code Division Multiple Access (WCDMA) network, a Global System for Mobile communication (GSM) or the like. The wireless communication system 100 may even be an evolution of any one of the aforementioned systems or a combination thereof.

The wireless communication system 100 comprises a node 102. As used herein, the term "node" or "radio network node" may, for example, refer to a Base Station (BS), a Base Transceiver Station (BTS), a Radio Base Station (RBS), a Remote Radio Unit (RRU), an access point, a NodeB in so called Third Generation (3G) networks, evolved Node B (eNodeB or eNB) in Long Term Evolution (LTE) networks, or the like. In UMTS Terrestrial Radio Access Network (UTRAN) networks, the term "radio network node" may also refer to a Radio Network Controller. Furthermore, in Global System for Mobile Communications (GSM) EDGE Radio Access Network (GERAN), where EDGE is short for Enhanced Data rates for GSM Evolution, the term "radio network node" may also refer to a Base Station Controller (BSC). As indicated in FIG. 1, the radio network node 102 may be connected to other nodes in the system, exemplified by an entity 103, such as any entity in a so called core network or other networks. It is to be noted, however, that any details regarding communication with such an entity 103 is outside the scope of the present disclosure.

A number of wireless communication devices are located in the wireless communication system 100. These are a first wireless communication device 104, a second wireless communication device 106 and a third wireless communication device 108. As used herein, the term "wireless communication device" may refer to a UE, a subscriber unit, mobile phone, a cellular phone, a Personal Digital Assistant (PDA), equipped with radio communication capabilities, a smartphone, a laptop or personal computer (PC) equipped with an internal or external mobile broadband modem, a tablet PC with radio communication capabilities, a portable electronic radio communication device or the like. In some examples, each of the first, second and third wireless device 104, 106, 108 may be associated with a respective sensor (not shown). The respective sensor may be comprised in its corresponding wireless device.

It is to be noted that the concept of node, such as the node 102 is to be interpreted in a wide sense. That is, a node may refer to a network node as well as to a wireless communication device, as exemplified above.

The wireless communication devices 104, 106, 108 may communicate with the node 102 and also communicate with each other by way of so-called device to device, D2D, communication. The communication is realized via radio waves transmitted and received via antennas that each has at least one antenna beam associated with transmission and reception. In FIG. 1 these antenna beams are illustrated as follows.

Communication, i.e. cellular communication, between the first wireless communication device 104 and the node 102 takes place via a transmission and/or reception antenna beam 111*a* of the node 102 and a transmission and/or reception antenna beam 113*a* of the first wireless communication device 104. Communication between the second wireless communication device 106 and the node 102 takes place via a transmission and/or reception antenna beam 111*b* of the node 102 and a transmission and/or reception antenna beam 113*b* of the second wireless communication device 106. Communication between the third wireless communication device 108 and the node 102 takes place via a transmission and/or reception antenna beam 111*c* of the node 102 and a transmission and/or reception antenna beam 113*c* of the third wireless communication device 108.

As illustrated in FIG. 1, a spatial xy-coordinate system, i.e. a so called Cartesian coordinate system, is associated with the system 100. With reference to this coordinate system, all entities in the system 100 may be associated with a specific position and a specific movement vector at any given point in time. As the skilled person will realize, the two dimensional xy-coordinate system illustrated in FIG. 1 represents a three dimensional coordinate system, but only two dimensions are shown for the sake of simplicity and clarity of the drawings. Moreover, movement in the system 100 is to be interpreted as any type of movement, including translation and rotation, in three dimensions as the skilled person will realize. The respective movement vectors are illustrated such that the first wireless communication device 104 has a first movement vector 144, the second wireless communication device 106 has a second movement vector 146, and the third wireless communication device 108 has a third movement vector 148. The node 102 is associated with a movement vector 142.

The antenna beams 111*a-c*, 113*a-c*, 115*a-b* are all associated with a direction and a shape. Such beam directions are schematically exemplified in FIG. 1 by beam directions 121, 123. Furthermore, all antenna beams 111*a-c*, 113*a-c*, 115*a-b* are all associated with an individual shape. It is to be noted, as the skilled person understands, all antenna beams are associated with a specific individual direction and shape extending in three dimensions, although FIG. 1 illustrates these directions and shapes in a very schematic way.

As will be discussed in some more detail below, directions and shapes of the antenna beams 111*a-c*, 113*a-c*, 115*a-b* are controlled at least partly based on spatial sensor data relating to, e.g., positions and movement of the wireless communication devices 104, 106, 108. The direction and shape of an antenna beam, such as any of the beams 111*a-c*, 113*a-c*, 115*a-b*, is obtained in electronic radio circuitry by way of setting so-called antenna weights to specific values that, in combination, cause an antenna connected to the radio circuitry to transmit radio energy (in a transmission context) and receive radio energy (in a reception context). Antenna weights relate to at least one of phase, amplitude, and delay of signals associated with antenna elements and they adjust the magnitude, phase and delay of the transmit signal (in the transmission context) and of the receive signal (in the reception context). The output from the array of antennas forms a transmit/receive beam in the desired direction and minimize the output in others.

Figure 2:
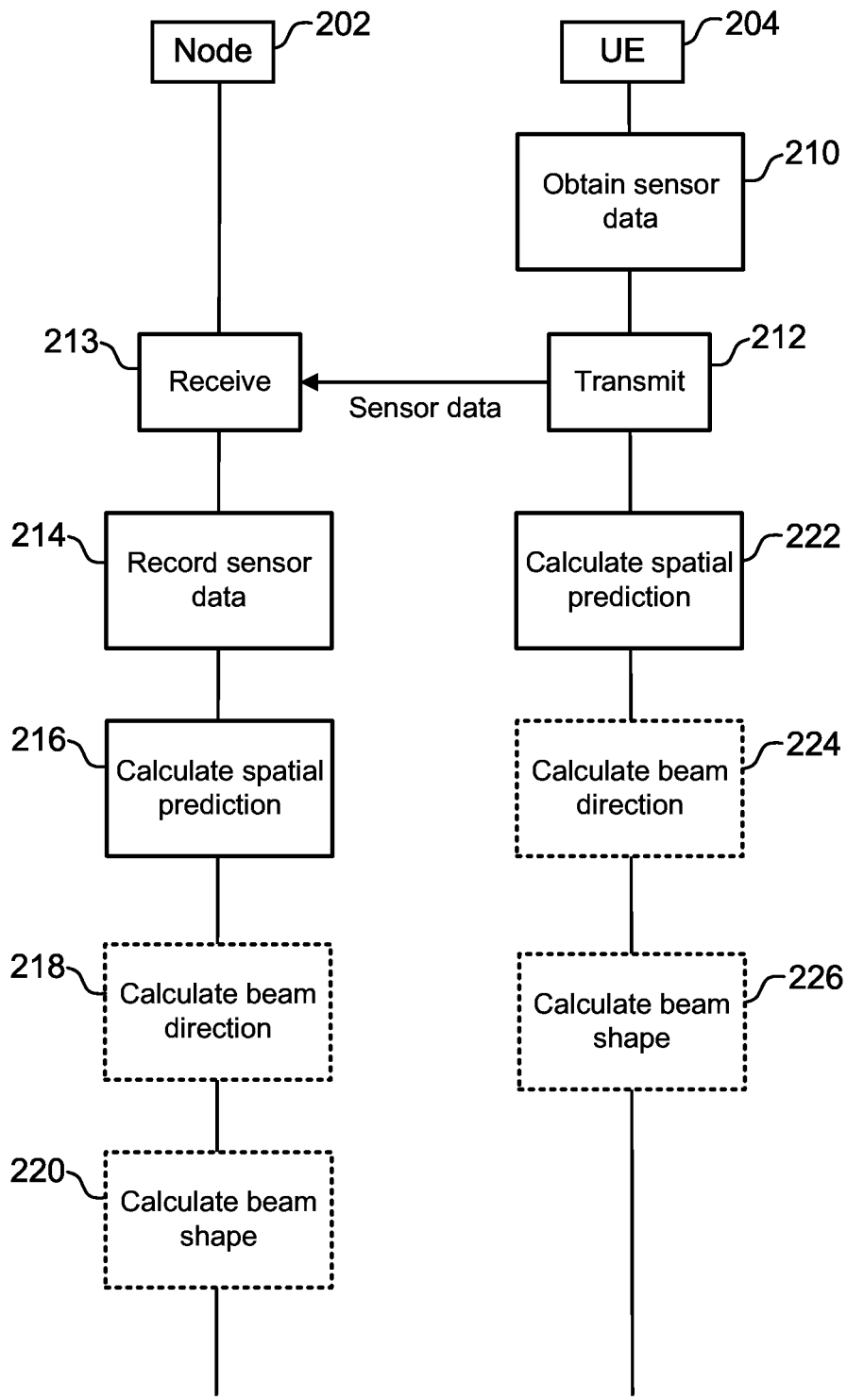
FIGS. 2 and 3 are combined flow charts and signalling diagrams illustrating embodiments of methods in a wireless communication system, FIG. 4 schematically illustrates a block diagram of node in a wireless communication system, FIG. 5 schematically illustrates a block diagram of a wireless communication device in a wireless communication system, FIG. 6 schematically illustrates a block diagram of node in a wireless communication system, and FIGS. 7 and 8 schematically illustrate block diagrams of wireless communication devices in a wireless communication system.

Turning now to FIG. 2, embodiments of methods in a node 202 and in a wireless communication device 204 will be discussed in some detail. The node 202 may correspond to the node 102 in FIG. 1 and the wireless communication device 204 may correspond to any of the wireless communication devices 104, 106, 108 in FIG. 1. A general concept of the embodiments described with reference to FIG. 2 is that they are iterative processes where spatial predictions are calculated in the node 202 as well as in the wireless communication device 204 in order to enable antenna beam control in the node 202 and in the wireless communication device 204. It is to be noted that in FIG. 2 references will be made to a first wireless communication device as well as to a second wireless communication device, both of which correspond to the wireless communication device 204 in FIG. 2. In other words, the wireless communication device 204 can be referred to as a first wireless communication device 204 or a second wireless communication device 204.

In an obtaining step 210, spatial sensor data relating to the first wireless communication device 204 is obtained, e.g., from at least one sensor in the first wireless communication device 204. For example, the spatial sensor data may comprises any one or more of position data, translation data (i.e. data describing linear movement), and rotation data. The rotation data may represent angular velocity. Angular velocity of orientation refers to the pure rotational movement of a first wireless device, that is, rotation of device essentially not affecting the position of the first wireless device in relation to a second wireless device or node, for example as measured at the sensor or antenna arrangement. Angular velocity of direction refers to the spatial movement of a first wireless device, for example as measured at the sensor or antenna arrangement, in relation to a second wireless device or node that results in a change of the direction, see e.g. angles 121 and 123 in FIG. 1, between a first wireless device a second wireless device or node.

The spatial sensor data may be absolute values with respect to a fixed reference frame common to all devices or the spatial sensor data may be values that are relative between the node 202 and the first wireless communication device 204 or a combination of the absolute and relative values.

In a sending step 212 in the first wireless communication device 204 and corresponding reception step 213 in the node 202, the obtained spatial sensor data relating to the first wireless communication device 204 is provided to the node 202.

In a recording step 214 in the node 202, the received data is recorded such that a time sequence of historical and current spatial sensor data relating to the first wireless communication device 204 is maintained. This step is a manifestation of the iterative process of the methods running in the node 202 and the first wireless communication device 204.

A calculation step 216 is performed in the node 202 where data of the time sequence of historical and current spatial sensor data relating to the first wireless communication device 204 is used. The calculation 216 results in predicted spatial data for use in controlling at least one antenna beam in the wireless communication system 100. For example, and as will be described further in connection with various embodiments below, antenna beams to be controlled by the use of the spatial predictions may be any of the antenna beams 111, 113, 115 illustrated in FIG. 1. The fact that a prediction is calculated means that the calculation provides spatial data pertaining to a point in time that is later than a current time, remembering that the method is an iterative process.

A calculation step 222 is performed in the first wireless communication device 204 where data of the time sequence of historical and current spatial sensor data relating to the first wireless communication device 204 is used. The calculation 222 results in predicted spatial data for use in controlling at least one antenna beam in the first wireless communication device 204. For example, and as will be described further in connection with various embodiments below, antenna beams to be controlled by the use of the spatial predictions may be any of the antenna beams 113, 115 illustrated in FIG. 1. The fact that a prediction is calculated means that the calculation provides spatial data pertaining to a point in time that is later than a current time, remembering that the method is an iterative process.

In some embodiments, as indicated by a calculation step 218 in the node 202, the predicted spatial data is used to calculate a prediction of beam forming antenna weights for use in controlling a direction of at least one antenna beam in the node 202. For example, the calculated prediction of beam forming antenna weights may be used during the iterative process in the node 202 for controlling an antenna beam to point in a direction from the node 202 to the first wireless communication device 204.

Examples of such embodiments include those where the calculation of a prediction of beam forming antenna weights comprises an extrapolation procedure. Further examples of such embodiments include those where the calculation of a prediction of beam forming antenna weights comprises a stochastic linear prediction procedure. Yet further examples of such embodiments include those where the calculation of a prediction of beam forming antenna weights comprises a Kalman filtering procedure. These examples of predictions of antenna weights are described in detail in appendix A-1, A-2 and A-3.

In some embodiments, as indicated by a calculation step 220 in the node 202, the predicted spatial data is used to calculate a prediction of beam forming antenna weights for use in controlling a shape of at least one antenna beam in the node 202. Such a calculation of antenna beam shape may comprise calculating an uncertainty metric that indicates a weighted sum of an angular velocity of direction to the first wireless communication device 204 as seen from the node 202 and an angular velocity of orientation of the node 202. This calculation of an uncertainty metric may then be followed by a mapping of the calculated uncertainty metric to a beam shape metric. For example, a selection may be made from a look-up table (or other mapping function) that in turned receives an uncertainty metric indicating how fast the spatialdata is changing. Basically, the faster the change the higher the uncertainty metric and the wider the beam shape. There should be at least two entries in the mapping function. The calculation of the beam forming antenna weights then comprises using the calculated beam shape metric.

In some embodiments, as indicated by a calculation step 224 in the first wireless communication device 204, the predicted spatial data is used to calculate a prediction of beam forming antenna weights for use in controlling a direction of at least one antenna beam in the first wireless communication device 204. For example, the calculated prediction of beam forming antenna weights may be used during the iterative process in the first wireless communication device 204 for controlling an antenna beam to point in a direction from the first wireless communication device 204 to the node 202.

Similar to the calculations 218 performed in the node 202, as described above, examples of such embodiments include those where the calculation of a prediction of beam forming antenna weights comprises an extrapolation procedure. Further examples of such embodiments include those where the calculation of a prediction of beam forming antenna weights comprises a stochastic linear prediction procedure. Yet further examples of such embodiments include those where the calculation of a prediction of beam forming antenna weights comprises a Kalman filtering procedure. When realizing such calculations, the skilled person will apply suitable modifications in the examples of predictions of antenna weights that are described in detail in appendix A-1, A-2 and A-3.

Moreover, embodiments include those where, as indicated by a calculation step 226 in the first wireless communication device 204, the predicted spatial data is used to calculate a prediction of beam forming antenna weights for use in controlling a shape of at least one antenna beam in the first wireless communication device 204. Similar to the calculations that may be performed in the node 202, such a calculation of antenna beam shape may comprise calculating an uncertainty metric that indicates a weighted sum of an angular velocity of direction to the node 202 as seen from the first wireless communication device 204 and an angular velocity of orientation of the first wireless communication device 204. This calculation of an uncertainty metric may then be followed by a mapping of the calculated uncertainty metric to a beam shape metric. For example, a selection may be made from a look-up table (or other mapping function) that in turned receives an uncertainty metric indicating how fast the spatial data is changing. Basically, the faster the change the higher the uncertainty metric and the wider the beam shape. There should be at least two entries in the mapping function. The calculation of the beam forming antenna weights then comprises using the calculated beam shape metric.

Figure 3:
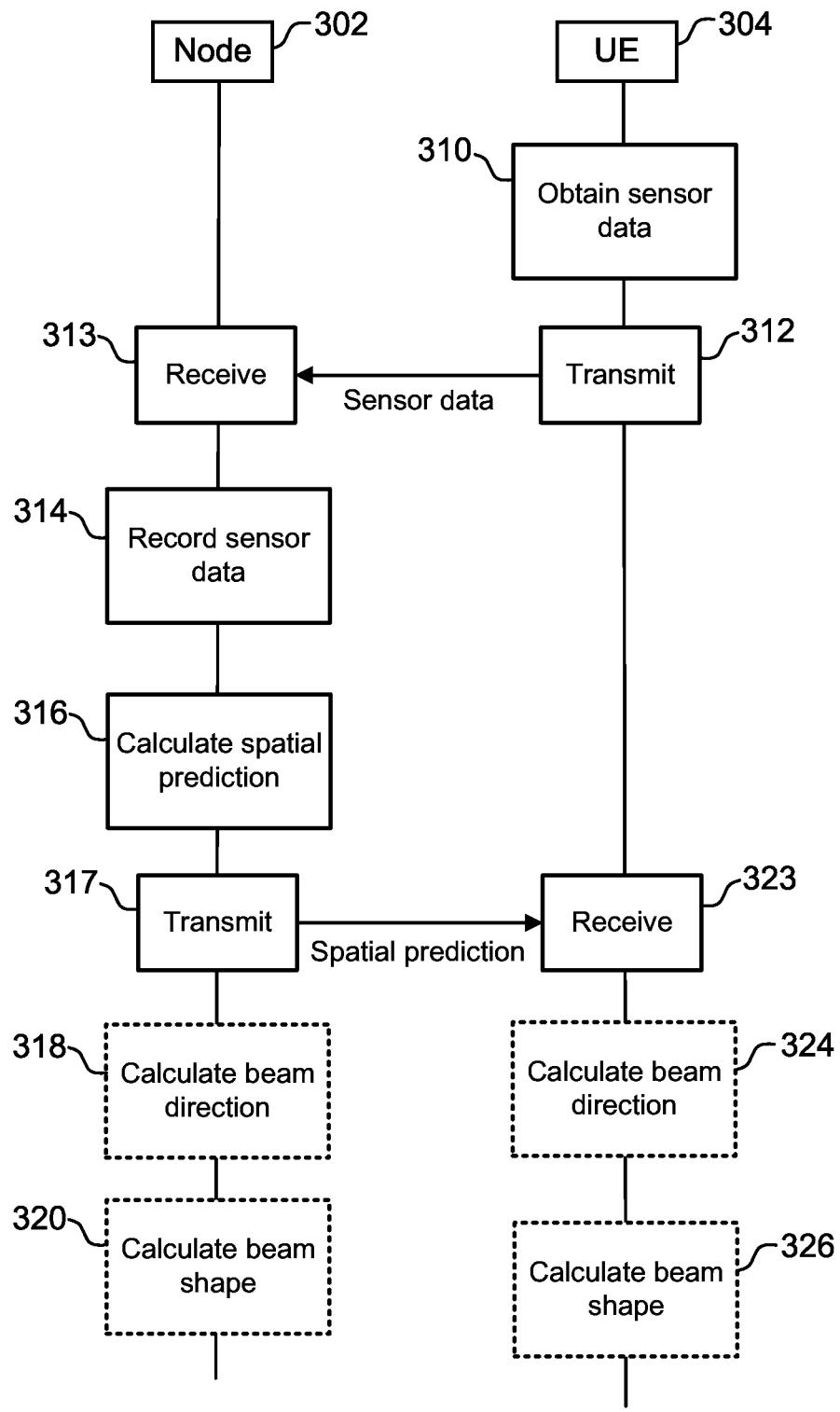

Turning now to FIG. 3, embodiments of methods in a node 302 and in a wireless communication device 304 will be discussed in some detail. The node 302 may correspond to the node 102 in FIG. 1 and the wireless communication device 304 may correspond to any of the wireless communication devices 104, 106, 108 in FIG. 1. A general concept of the embodiments described with reference to FIG. 3 is that they are iterative processes where spatial predictions are calculated in the node 302, which enables antenna beam control in the node 302. The spatial predictions are provided to the wireless communication device 304 in order to enable antenna beam control in the wireless communication device 304. It is to be noted that in FIG. 3 references will be made to a first wireless communication device as well as to a second wireless communication device, both of which correspond to the wireless communication device 304 in FIG. 3. In such embodiments where a first and a second wireless communication device are involved in a device-to-device, D2D, communication, the concept is that the node 302 assists the wireless communication devices in their D2D communication by enabling antenna beam control in the wireless communication devices.

In an obtaining step 310, spatial sensor data relating to the first wireless communication device 304 is obtained from at least one sensor in the first wireless communication device 304. For example, the spatial sensor data may comprises any one or more of position data, translation data (i.e. data describing linear movement), and rotation data. The rotation data may represent angular velocity as defined in connection with step 210 above.

The spatial sensor data may be absolute values or the spatial sensor data may be values that are relative between the node 302 and the first wireless communication device 304 or a combination of the absolute and relative values.

In a sending step 312 in the first wireless communication device 304 and corresponding reception step 313 in the node 302, the obtained spatial sensor data relating to the first wireless communication device 304 is provided to the node 302.

In a recording step 314 in the node 302, the received data is recorded such that a time sequence of historical and current spatial sensor data relating to the first wireless communication device 304 is maintained. This step is a manifestation of the iterative process of the methods running in the node 302 and the first wireless communication device 304.

A calculation step 316 is performed in the node 302 where data of the time sequence of historical and current spatial sensor data relating to the first wireless communication device 304 is used. The calculation 316 results in predicted spatial data for use in controlling at least one antenna beam in the wireless communication system. For example, and as will be described further in connection with various embodiments below, antenna beams to be controlled by the use of the spatial predictions may be any of the antenna beams 111, 113, 115 illustrated in FIG. 1. The fact that a prediction is calculated means that the calculation provides spatial data pertaining to a point in time that is later than a current time, remembering that the method is an iterative process.

In some embodiments, as indicated by a transmission step 317 in the node 302 and a corresponding reception step 323 in the first wireless communication device 304, at least a subset of the predicted spatial data is provided to the first wireless communication device 304.

In some embodiments, as indicated by a calculation step 318 in the node 302, the predicted spatial data is used to calculate a prediction of beam forming antenna weights for use in controlling a direction of at least one antenna beam in the node 302. For example, the calculated prediction of beam forming antenna weights may be used during the iterative process in the node 302 for controlling an antenna beam to point in a direction from the node 302 to the first wireless communication device 204.

Examples of such embodiments include those where the calculation of a prediction of beam forming antenna weights comprises an extrapolation procedure. Further examples of such embodiments include those where the calculation of a prediction of beam forming antenna weights comprises a stochastic linear prediction procedure. Yet further examples of such embodiments include those where the calculation of a prediction of beam forming antenna weights comprises a Kalman filtering procedure. These examples of predictions of antenna weights are described in detail in appendix A-1, A-2 and A-3.

In some embodiments, as indicated by a calculation step 320 in the node 302, the predicted spatial data is used to calculate a prediction of beam forming antenna weights for use in controlling a shape of at least one antenna beam in the node 302. Such a calculation of antenna beam shape may comprise calculating an uncertainty metric that indicates a weighted sum of an angular velocity of direction to the first wireless communication device 304 as seen from the node 302 and an angular velocity of orientation of the node 302. This calculation of an uncertainty metric may then be followed by a mapping of the calculated uncertainty metric to a beam shape metric. For example, a selection may be made from a look-up table (or other mapping function) that in turned receives an uncertainty metric indicating how fast the spatial data is changing. Basically, the faster the change the higher the uncertainty metric and the wider the beam shape. There should be at least two entries in the mapping function. The calculation of the beam forming antenna weights then comprises using the calculated beam shape metric.

In some embodiments, as indicated by a calculation step 324 in the first wireless communication device 304, the received predicted spatial data is used to calculate a prediction of beam forming antenna weights for use in controlling a direction of at least one antenna beam in the first wireless communication device 304. For example, the calculated prediction of beam forming antenna weights may be used during the iterative process in the first wireless communication device 304 for controlling an antenna beam to point in a direction from the first wireless communication device 304 to the node 302.

Similar to the calculations 318 performed in the node 302, as described above, examples of such embodiments include those where the calculation of a prediction of beam forming antenna weights comprises an extrapolation procedure. Further examples of such embodiments include those where the calculation of a prediction of beam forming antenna weights comprises a stochastic linear prediction procedure. Yet further examples of such embodiments include those where the calculation of a prediction of beam forming antenna weights comprises a Kalman filtering procedure. When realizing such calculations, the skilled person will apply suitable modifications in the examples of predictions of antenna weights that are described in detail in appendix A-1, A-2 and A-3.

Moreover, embodiments include those where, as indicated by a calculation step 326 in the first wireless communication device 304, the received predicted spatial data is used to calculate a prediction of beam forming antenna weights for use in controlling a shape of at least one antenna beam in the first wireless communication device 304. Similar to the calculations that may be performed in the node 302, such a calculation of antenna beam shape may comprise calculating an uncertainty metric that indicates a weighted sum of an angular velocity of direction to the node 302 as seen from the first wireless communication device 304 and an angular velocity of orientation of the first wireless communication device 304. This calculation of an uncertainty metric may then be followed by a mapping of the calculated uncertainty metric to a beam shape metric. For example, a selection may be made from a look-up table (or other mapping function) that in turned receives an uncertainty metric indicating how fast the spatial data is changing. Basically, the faster the change the higher the uncertainty metric and the wider the beam shape. There should be at least two entries in the mapping function. The calculation of the beam forming antenna weights then comprises using the calculated beam shape metric.

In some embodiments, the node 302 assists two wireless communication devices in controlling their respective antenna beams when performing D2D communication. For example, as FIG. 1 illustrates, wireless communication devices 104 and 106 communicate in a D2D context via antenna beams 115a and 115b, respectively. Such embodiments may be illustrated by FIG. 3 by noting that reception step 312, recording step 314, calculation step 316 and transmission step 317 is performed in connection with the first wireless communication device as well as in connection with a second wireless communication device. As the skilled person will realize, in these embodiments, the first and the second wireless communication devices are mutually interchangeable and therefore the reference numeral 304 is used to denote both the first and the second wireless communication device.

Such embodiments may consequently comprise the reception step 313 where spatial sensor data relating to a second wireless communication device 304 is received from the second wireless communication device 304. The received data is recorded, in the recording step 314, such that a time sequence of historical and current spatial sensor data relating to the second wireless communication device 304 is maintained. Using this data of the time sequence of historical and current spatial sensor data relating to the second wireless communication device, predicted spatial data is calculated in the calculation step 316 for use in controlling at least one antenna beam. At least a subset of the calculated predicted spatial data is then sent, in the sending step 317, to the first wireless communication device 304 for controlling an antenna beam to point in a direction from the first wireless communication device to the second wireless communication device.

In the wireless communication devices 304, such D2D embodiments may comprise the following steps. In the reception step 323, receiving from the node 302, predicted spatial data relating to the second wireless communication device. The calculation of a prediction of beam forming antenna weights then comprises, in the calculation step 324, calculating, using the received predicted spatial data relating to the second wireless communication device, a prediction of beam forming antenna weights for use in controlling a direction of at least one antenna beam to point in a direction from the first wireless communication device to the second wireless communication device.

Furthermore, in the wireless communication devices 304, such D2D embodiments may also comprise the following steps. In the calculation step 326, calculating, using the received predicted spatial data, a prediction of beam forming antenna weights for use in controlling a shape of at least one antenna beam in the first wireless communication device. These embodiments may comprise calculating an uncertainty metric that indicates a weighted sum of an angular velocity of direction to the second wireless communication device as seen from the first wireless communication device and an angular velocity of orientation of the first wireless communication device. The calculated uncertainty metric may then be mapped to a beam shape metric, and the calculation of the beam forming antenna weights then comprises using the calculated beam shape metric.

Turning now to FIGS. 4 to 8, node, wireless communication device and corresponding computer programs will be described in some detail.

Figure 4:
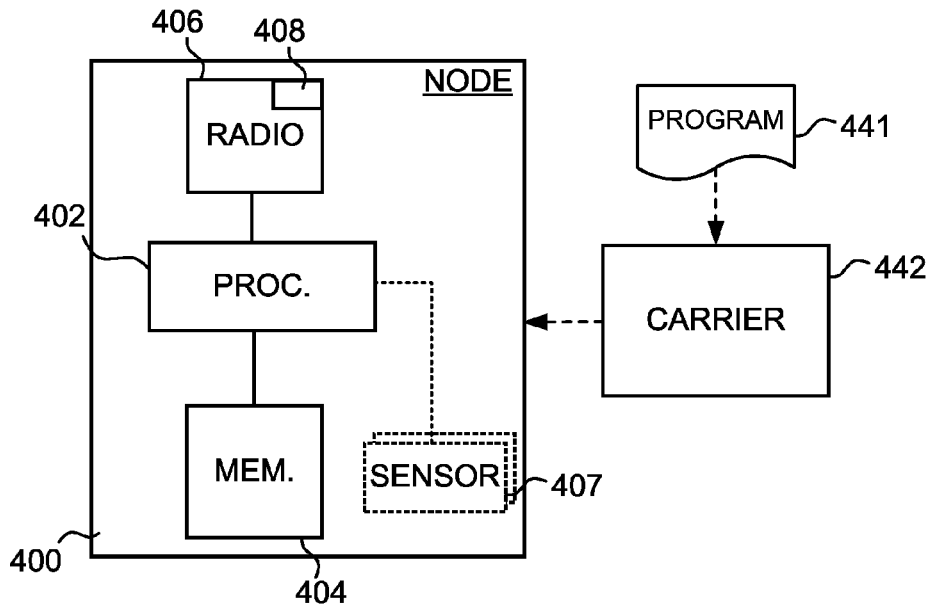

FIG. 4 illustrates a node 400. The node 400, which may be any node as described above in connection with FIGS. 1 to 3, comprises radio circuitry 406, a processor 402 and a memory 404. The radio circuitry 406 comprises at least one antenna 408 that emits and receives radio waves according to antenna beams as discussed above and as exemplified in FIG. 1. In some embodiments, in which the node 400 represents a wireless communication device, the node 400 may comprise a sensor 407 for sensing spatial sensor data.

Examples of embodiments of the sensor 407 include gyroscope, accelerometer, compass, and a satellite navigation system device such as a global positioning system (GPS) unit or a global navigation satellite system (GLONASS) device or a Galileo system device. For example, the gyroscope captures angular movements and may provide the orientation of the node 400. The accelerometer captures acceleration that in turn can be integrated to provide speed and change in position. An accelerometer measuring along several axes may also provide orientation data.

The memory 404 comprises instructions executable by the processor 402 whereby the node 400 is operative to:
  receive, from a wireless communication device, spatial sensor data relating to the wireless communication device,
  record the received data such that a time sequence of historical and current spatial sensor data relating to the wireless communication device is maintained,
  calculate, using data of the time sequence of historical and current spatial sensor data relating to the wireless communication device, predicted spatial data for use in controlling at least one antenna beam in the wireless communication system.

The instructions, e.g. stored in the memory 404, that are executable by the processor 402 may be software in the form of a computer program 441. The computer program 441 may be contained in or by a carrier 442, which may provide the computer program 441 to the memory 404 and processor

402. The carrier 442 may be in any suitable form including an electronic signal, an optical signal, a radio signal or a computer readable storage medium.

In some embodiments, the node 400 is operative to:
calculate, using the predicted spatial data, a prediction of beam forming antenna weights for use in controlling a direction of at least one antenna beam in the node.

In some embodiments, the node 400 is operative to:
calculate a prediction of beam forming antenna weights comprising an extrapolation procedure.

In some embodiments, the node 400 is operative to:
calculate a prediction of beam forming antenna weights comprising a stochastic linear prediction procedure.

In some embodiments, the node 400 is operative to:
calculate a prediction of beam forming antenna weights comprising a Kalman filtering procedure.

In some embodiments, the node 400 is operative to:
use the calculated prediction of beam forming antenna weights during the iterative process in the node for controlling an antenna beam to point in a direction from the node to the first wireless communication device.

In some embodiments, the node 400 is operative to:
calculate, using the predicted spatial data, a prediction of beam forming antenna weights for use in controlling a shape of at least one antenna beam in the node.

In some embodiments, the node 400 is operative to:
calculate an uncertainty metric that indicates a weighted sum of an angular velocity of direction to the first wireless communication device as seen from the node and an angular velocity of orientation of the node, and map the calculated uncertainty metric to a beam shape metric, and wherein the calculation of the beam forming antenna weights further comprises using the beam shape metric.

In some embodiments, the node 400 is operative to:
send at least a subset of the predicted spatial data to the first wireless communication device.

In some embodiments, the node 400 is operative to:
receive, from a second wireless communication device, spatial sensor data relating to the second wireless communication device,
record the received spatial sensor data such that a time sequence of historical and current spatial sensor data relating to the second wireless communication device is maintained, and wherein the calculation of predicted spatial data for use in controlling at least one antenna beam further comprises using data of the time sequence of historical and current spatial sensor data relating to the second wireless communication device, and
send, to the first wireless communication device, at least a subset of the calculated predicted spatial data for controlling an antenna beam to point in a direction from the first wireless communication device to the second wireless communication device.

Figure 5:
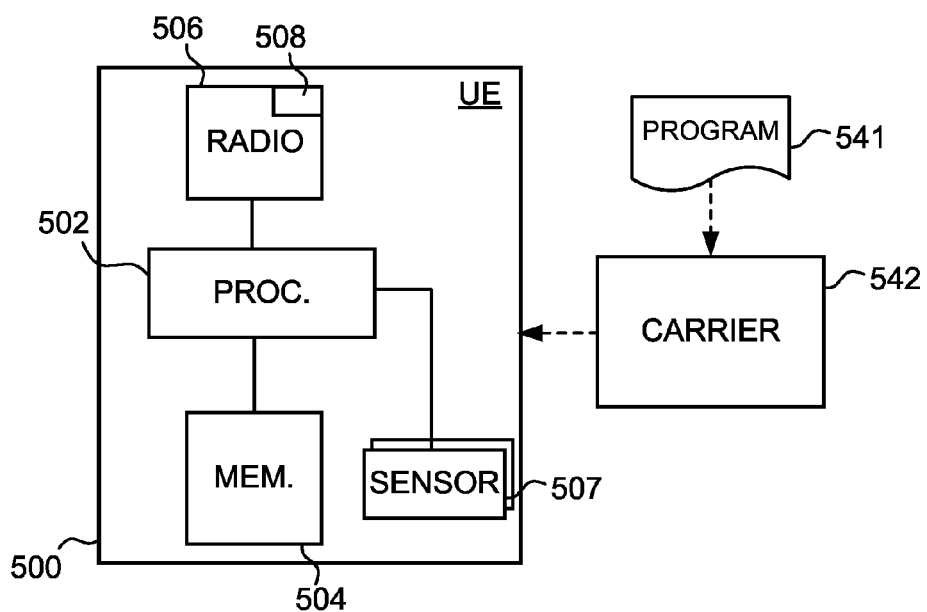

FIG. 5 illustrates a wireless communication device 500. The wireless communication device 500 comprises radio circuitry 506, a processor 502, a memory 504 and at least one sensor 507 for sensing spatial sensor data.

Examples of embodiments of the sensor 507 include gyroscope, accelerometer, compass, and a satellite navigation system device such as a global positioning system (GPS) unit or a global navigation satellite system (GLONASS) device or a Galileo system device. For example, the gyroscope captures angular movements and may provide the orientation of the node wireless communication device 500. The accelerometer captures acceleration that in turn can be integrated to provide speed and change in position. An accelerometer measuring along several axes may also provide orientation data.

The radio circuitry 506 comprises at least one antenna 508 that emits and receives radio waves according to antenna beams as discussed above and as exemplified in FIG. 1.

The memory 504 comprises instructions executable by the processor 502 whereby the wireless communication device 500 is operative to:
obtain, from the at least one sensor 507, spatial sensor data relating to the wireless communication device 500,
send, to a node in the wireless communication system, the obtained spatial sensor data relating to the wireless communication device 500,
calculate, using data of the time sequence of historical and current spatial sensor data relating to the wireless communication device 500, predicted spatial data for use in controlling at least one antenna beam in the wireless communication device 500.

In some embodiments, the memory 504 comprises instructions executable by the processor 502 whereby the wireless communication device 500 is operative to:
obtain, from at least one sensor in the wireless communication device, spatial sensor data relating to the wireless communication device,
send, to a node in the wireless communication system, the obtained spatial sensor data relating to the wireless communication device, and
receive, from the node, predicted spatial data, for use in controlling at least one antenna beam in the wireless communication device.

The instructions, e.g. stored in the memory 504, that are executable by the processor 502 may be software in the form of a computer program 541. The computer program 541 may be contained in or by a carrier 542, which may provide the computer program 541 to the memory 504 and processor 502. The carrier 542 may be in any suitable form including an electronic signal, an optical signal, a radio signal or a computer readable storage medium.

In some embodiments, the wireless communication device 500 is operative to:
calculate, using the calculated predicted spatial data, a prediction of beam forming antenna weights for use in controlling a direction of at least one antenna beam in the first wireless communication device.

In some embodiments, the wireless communication device 500 is operative to:
calculate, using the calculated predicted spatial data, a prediction of beam forming antenna weights for use in controlling a shape of at least one antenna beam in the first wireless communication device.

In some embodiments, the wireless communication device 500 is operative to:
calculate a prediction of beam forming antenna weights comprising an extrapolation procedure.

In some embodiments, the wireless communication device 500 is operative to:
calculate a prediction of beam forming antenna weights comprising a stochastic linear prediction procedure.

In some embodiments, the wireless communication device 500 is operative to:
calculate a prediction of beam forming antenna weights comprising a Kalman filtering procedure.

In some embodiments, the wireless communication device 500 is operative to:
use the calculated prediction of beam forming antenna weights during the iterative process in the node for controlling an antenna beam to point in a direction from the first wireless communication device to the node.

In some embodiments, the wireless communication device 500 is operative to:
receive, from the node, predicted spatial data relating to a second wireless communication device, and
calculate, using the received predicted spatial data relating to a second wireless communication device, a prediction of beam forming antenna weights for use in controlling a direction of at least one antenna beam to point in a direction from the first wireless communication device to the second wireless communication device.

In some embodiments, the wireless communication device 500 is operative to:
calculate, using the received predicted spatial data, a prediction of beam forming antenna weights for use in controlling a shape of at least one antenna beam in the first wireless communication device.

In some embodiments, the wireless communication device 500 is operative to:
calculate an uncertainty metric that indicates a weighted sum of an angular velocity of direction to the node as seen from the first wireless communication device and an angular velocity of orientation of the first wireless communication device,
map the calculated uncertainty metric to a beam shape metric, and wherein the calculation of the beam forming antenna weights further comprises using the beam shape metric.

In some embodiments, the wireless communication device 500 is operative to:
calculate an uncertainty metric that indicates a weighted sum of an angular velocity of direction to the second wireless communication device as seen from the first wireless communication device and an angular velocity of orientation of the first wireless communication device,
map the calculated uncertainty metric to a beam shape metric, and wherein the calculation of the beam forming antenna weights further comprises using the beam shape metric.

FIG. 6 illustrates a node 600 for antenna beam control in a wireless communication system. The node 600, which may be any node as described above in connection with FIGS. 1 to 3, comprises:
a receiving module 602 configured to receive, from a wireless communication device, spatial sensor data relating to the wireless communication device,
a recording module 604 configured to record the received data such that a time sequence of historical and current spatial sensor data relating to the wireless communication device is maintained,
a calculating module 606 configured to calculate, using data of the time sequence of historical and current spatial sensor data relating to the wireless communication device, predicted spatial data for use in controlling at least one antenna beam in the wireless communication system.

FIG. 7 illustrates a wireless communication device 700 for antenna beam control in a wireless communication system. The wireless communication device 700, which may be any wireless communication device as described above in connection with FIGS. 1 to 3, comprises:
an obtaining module 702 configured to obtain, from at least one sensor 704 in the wireless communication device 700, spatial sensor data relating to the wireless communication device 700,
a sending module 706 configured to send, to a node in the wireless communication system, the obtained spatial sensor data relating to the wireless communication device 700,
a calculating module 708 configured to calculate, using data of the time sequence of historical and current spatial sensor data relating to the wireless communication device 700, predicted spatial data for use in controlling at least one antenna beam in the wireless communication device 700.

FIG. 8 illustrates a wireless communication device 800 for antenna beam control in a wireless communication system. The wireless communication device 800, which may be any wireless communication device as described above in connection with FIGS. 1 to 3, comprises:
an obtaining module 802 configured to obtain, from at least one sensor 804 in the wireless communication device 800, spatial sensor data relating to the wireless communication device 800,
a sending module 806 configured to send, to a node in the wireless communication system, the obtained spatial sensor data relating to the wireless communication device 800,
a receiving module 808 configured to receive, from the node, predicted spatial data, for use in controlling at least one antenna beam in the wireless communication device 800.

As used herein, the term "processing module" may refer to a processing circuit, a processing unit, a processor, an Application Specific integrated Circuit (ASIC), a Field-Programmable Gate Array (FPGA) or the like. As an example, a processor, an ASIC, an FPGA or the like may comprise one or more processor kernels. In some examples, the processing module may be embodied by a software module or hardware module. Any such module may be a determining means, estimating means, capturing means, associating means, comparing means, identification means, selecting means, receiving means, transmitting means or the like as disclosed herein. As an example, the expression "means" may be a module, such as a determining module, selecting module, etc.

As used herein, the expression "configured to" may mean that a processing circuit is configured to, or adapted to, by means of software configuration and/or hardware configuration, perform one or more of the steps or actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), etc.

As used herein, the term "computer readable code units" may be text of a computer program, parts of or an entire binary file representing a computer program in a compiled format or anything there between.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

APPENDIX A-1, A-2 and A-3: Examples of Antenna Weight Calculations

In the following, the expression UE is used to represent a wireless communication device and BS is used to represent a node that may be a radio base station and also another wireless communication device.

It is not necessarily so that the absolute angles or positions need to be used for the UE and BS to guide beam steering/tracking/search. The angular velocity (or acceleration) and velocity (or acceleration) along any axis may be used to predict required adjustments (incremental as opposed to absolute settings).

As summarized and described in detail above, the relationship between the UE position and velocity parameters and the BS beam forming parameters may be established by the BS by correlating the beam tracking history to the observed sensor input during that period. The relationship should be updated frequently.

In some embodiments, a Kalman (or related) filter structure may be used at a node to aggregate e.g. the past and current sensor information, beam steering parameters, and resulting signal quality (SINR—signal to interference and noise ratio) and performance (BLER—block error rate, TP—throughput in bits per second) statistics to produce the beam steering output for the next time instance. The Kalman model is implementation-dependent; for certain model designs, the relationship between the UE position and velocity parameters and the BS beam forming parameters is implicitly obtained as part of the Kalman model parameter estimation/tracking and requires no explicit identification.

In other embodiments, linear prediction, extrapolation, or other approaches may be used to derive desired beam forming parameters based on movement sensor inputs.

The number of possible system configurations with different sensor inputs and tracking algorithms that can utilize and benefit from the principles is large. In the following, concrete examples of how the beam direction from a BS to a UE may be updated through the tracking of the UE locations based on sensor information are presented.

A-1. Prediction Through Extrapolation

Let y[n] denote the 3-dimensional coordinate vector of the true location of a UE. Suppose a sensor (e.g. an accelerometer) can provide an estimate $\tilde{y}[n]$ of the UE location y[n] at time n. The UE location at time (n+1) can be predicted using simple extrapolation as $$\hat{y}[n+1] = \tilde{y}[n] + \alpha(\tilde{y}[n] - \tilde{y}[n-1])$$

where α is a predetermined positive constant. From the predicted location $\hat{y}[n+1]$, the beam forming antenna weights that lead to a direction pointing towards the predicted direction $(\hat{y}[n+1]-y_0)/\|\hat{y}[n+1]-y_0\|$ from a BS location $y_0$ can be computed as $$w[n+1] = \left[ e^{j\frac{2\pi(\hat{y}[n+1]-y_0)^T p_1}{\lambda \cdot \|\hat{y}[n+1]-y_0\|}}, e^{j\frac{2\pi(\hat{y}[n+1]-y_0)^T p_2}{\lambda \cdot \|\hat{y}[n+1]-y_0\|}}, \ldots, e^{j\frac{2\pi(\hat{y}[n+1]-y_0)^T p_{n_T}}{\lambda \cdot \|\hat{y}[n+1]-y_0\|}} \right]$$

where λ denotes the wavelength of the radio signal and $p_i$ denotes the coordinate of the $i$'th antenna of the BS, for i=1, 2, ..., $n_T$ (where $n_T$ denotes the number of antennas). The BS can pre-adjust the beam direction using the antenna weight vector w[n+1].

A-2. Stochastic Linear Prediction

Alternatively, one may compute a prediction of the next UE location based on a statistical model. For example, if we model the UE location using an auto-regressive (AR) random process of order M as $$y[n] = \sum_{m=1}^{M} a_m y[n-m] + q[n]$$

where q[n] is a zero-mean IID vector Gaussian random process, and $\{a_m\}_{m=1}^{M}$ are the linear predictive or auto-regressive coefficients, which can be computed based on the measured autocorrelations $\{R_y[m]\}_{m=0}^{M}$, where $$R_y[m] \equiv E[y[n]y[n-m]^H] \approx \frac{1}{N} \sum_{k=n}^{n-N+1} \tilde{y}[n]\tilde{y}[n-m]^H,$$

and N is a certain memory size, by solving the Yule-Walker equation:

$$\begin{bmatrix} R_y[1] \\ R_y[2] \\ \vdots \\ R_y[M] \end{bmatrix} = \begin{bmatrix} R_y[0] & R_y[1]^H & \ldots & R_y[M-1]^H \\ R_y[1] & R_y[0] & \ldots & R_y[M-2]^H \\ \vdots & \vdots & \ddots & \vdots \\ R_y[M-1] & R_y[M-2] & \ldots & R_y[0] \end{bmatrix} \begin{bmatrix} a_1 \\ a_2 \\ \vdots \\ a_3 \end{bmatrix}$$

The predicted UE location at the next time instance (n+1) can be computed as $$\hat{y}[n] = \sum_{m=1}^{M} a_m \tilde{y}[n-m].$$

The value M can be performed using some criteria like Akaike information criteria (AIC), Bayesian information criteria (BIC) and cross validation (CV).

The desired beam weights w[n+1] can then be computed as in section A-1.

A-3. Prediction Via Kalman Filtering

Suppose the sensors (e.g. accelerometers) can only provide estimates of the acceleration $\tilde{u}[n]$ and of the velocity $\tilde{v}[n]$ of a UE at any given time n, instead of the location of UE directly. One may track the location of the UE using a Kalman filtering. Let v[n] denote the 3-dimensional true velocity vector of the UE at time n, respectively. Let $x[n] \equiv [y[n]^T, v[n]^T]^T$ be the "state" of the UE. The dynamics of x[n] may be modeled using a set of state-space equations as follows:

$$x[n+1] = Ax[n] + B\tilde{u}[n] + w[n]$$

$$\tilde{v}[n] = Cx[n] + z[n]$$

-continued where $$A \equiv \begin{bmatrix} I_3 & (\Delta t)I_3 \\ 0 & I_3 \end{bmatrix}, B \equiv \begin{bmatrix} \frac{(\Delta t)^2}{2}I \\ (\Delta t)I \end{bmatrix}, B \equiv [0_3 \ I_3],$$

$\Delta t$ denotes the time duration between two sampling instances, $\{w[n]\}$ and $\{z[n]\}$ denotes zero-mean vector Gaussian random processes with covariance matrices $Q_w = E[w[n]w[n]^H]$ and $Q_z = E[z[n]z[n]^H]$, respectively, which are predetermined design parameters. Based on this model of the dynamics of y[n], the prediction $\hat{x}[n+1] = [\hat{y}[n]^T, \hat{v}[n]^T]^T$ of x[n+1] based on the past sensor measurements $\{\tilde{u}[k]\}_{k \leq n}$ and $\{\tilde{v}[k]\}_{k \leq n}$ can be computed recursively through the following Kalman filtering equations:

$$\hat{x}[n+1] = A\hat{x}^a[n] + B\tilde{u}[n],$$

$$\hat{P}[n+1] = A P^a[n] A^T + Q_w,$$

$$\hat{x}^a[n] = \hat{x}[n] + K[n](\tilde{v}[n] - C\hat{x}[n])$$

$$K[n] = \hat{P}[n]C^T(C\hat{P}[n]C^T + Q_z)^{-1}$$

$$P^a[n] = (I - K[n]C)\hat{P}[n].$$

The desired beam weights w[n+1] can then be computed as above from $\hat{y}[n]$. Alternative Kalman filter formulations exist that may produce the desired weights directly.

The invention claimed is:

1. A method performed by a node of a wireless communication system, for performing an iterative process, wherein the iterative process comprises:
   receiving, from a first wireless communication device, spatial sensor data relating to the first wireless communication device;
   recording the received spatial sensor data such that a time sequence of historical and current spatial sensor data relating to the first wireless communication device is maintained; and
   calculating, using data of the time sequence of historical and current spatial sensor data relating to the first wireless communication device, predicted spatial data relating to the first wireless communication device, for use in controlling at least one antenna beam in the wireless communication system;
   calculating an uncertainty metric that indicates a weighted sum of an angular velocity of direction to the first wireless communication device as seen from the node and an angular velocity of orientation of the node;
   mapping the calculated uncertainty metric to a beam shape metric; and
   calculating, using the predicted spatial data and the beam shape metric, a prediction of beam forming antenna weights for use in controlling a direction of at least one antenna beam in the node and a shape of at least one antenna beam in node, wherein the calculated prediction of beam forming antenna weights is used during the iterative process in the node for controlling an antenna beam to point in a direction from the node to the first wireless communication device;
   wherein the spatial sensor data comprises rotation data, and where the spatial sensor data are absolute values or values that are relative between the node and the first wireless communication device or a combination of said absolute and relative values.

2. The method of claim 1, wherein the calculation of a prediction of beam forming antenna weights comprises an extrapolation procedure.

3. The method of claim 1, wherein the calculation of a prediction of beam forming antenna weights comprises a stochastic linear prediction procedure.

4. The method of claim 1, wherein the calculation of a prediction of beam forming antenna weights comprises a Kalman filtering procedure.

5. The method of claim 1, wherein the iterative process further comprises:
   sending at least a subset of the predicted spatial data to the first wireless communication device.

6. A method performed by a node of a wireless communication system, for performing an iterative process, wherein the iterative process comprises:
   receiving, from a first wireless communication device, spatial sensor data relating to the first wireless communication device;
   recording the received spatial sensor data such that a time sequence of historical and current spatial sensor data relating to the first wireless communication device is maintained; and
   calculating, using data of the time sequence of historical and current spatial sensor data relating to the first wireless communication device, predicted spatial data related to the first wireless device, for use in controlling at least one antenna beam in the wireless communication system;
   wherein the iterative process further comprises:
   receiving, from a second wireless communication device, spatial sensor data relating to the second wireless communication device,
   recording the received spatial sensor data such that a time sequence of historical and current spatial sensor data relating to the second wireless communication device is maintained, and wherein the calculation of predicted spatial data for use in controlling at least one antenna beam further comprises using data of the time sequence of historical and current spatial sensor data relating to the second wireless communication device, and
   sending, to the first wireless communication device, at least a subset of the calculated predicted spatial data for controlling an antenna beam to point in a direction from the first wireless communication device to the second wireless communication device; and
   wherein the spatial sensor data comprises rotation data, and where the spatial sensor data are absolute values or values that are relative between the node and the first wireless communication device or a combination of said absolute and relative values.

7. A method performed by a first wireless communication device of a wireless communication system, for performing an iterative process, wherein the iterative process comprises:
   obtaining, from at least one sensor in the first wireless communication device, spatial sensor data relating to the first wireless communication device, wherein the spatial sensor data comprises rotation data, and where the spatial sensor data are absolute values or values that are relative between the node and the first wireless communication device or a combination of said absolute and relative values,
   sending, to a node in the wireless communication system, the obtained spatial sensor data relating to the first wireless communication device, and
   calculating, using data of a time sequence of historical and current spatial sensor data relating to the first wireless communication device, predicted spatial data relating to the first wireless communication device, for use in controlling at least one antenna beam in the first wireless communication device.

8. The method of claim 7, comprising:
calculating, using the calculated predicted spatial data, a prediction of beam forming antenna weights for use in controlling a direction of at least one antenna beam in the first wireless communication device.

9. The method of claim 7, comprising:
calculating, using the calculated predicted spatial data, a prediction of beam forming antenna weights for use in controlling a shape of at least one antenna beam in the first wireless communication device.

10. A method performed by a first wireless communication device of a wireless communication system, for performing an iterative process, wherein the iterative process comprises:
obtaining, from at least one sensor in the first wireless communication device, spatial sensor data relating to the first wireless communication device, wherein the spatial sensor data comprises rotation data, and where the spatial sensor data are absolute values or values that are relative between the node and the first wireless communication device or a combination of said absolute and relative values,
sending, to a node in the wireless communication system, the obtained spatial sensor data relating to the first wireless communication device, and
receiving, from the node, predicted spatial data spatial data relating to the first wireless communication device, for use in controlling at least one antenna beam in the first wireless communication device.

11. The method of claim 10, comprising:
calculating, using the received predicted spatial data, a prediction of beam forming antenna weights for use in controlling a direction of at least one antenna beam in the first wireless communication device.

12. The method of claim 11, wherein the calculation of a prediction of beam forming antenna weights comprises an extrapolation procedure.

13. The method of claim 11, wherein the calculation of a prediction of beam forming antenna weights comprises a stochastic linear prediction procedure.

14. The method of claim 11, wherein the calculation of a prediction of beam forming antenna weights comprises a Kalman filtering procedure.

15. The method of claim 11, wherein the calculated prediction of beam forming antenna weights is used during the iterative process in the first wireless communication device for controlling an antenna beam to point in a direction from the first wireless communication device to the node.

16. The method of claim 11, wherein the iterative process further comprises:
receiving, from the node, predicted spatial data relating to a second wireless communication device, and wherein the calculation of a prediction of beam forming antenna weights comprises:
calculating, using the received predicted spatial data relating to a second wireless communication device, a prediction of beam forming antenna weights for use in controlling a direction of at least one antenna beam to point in a direction from the first wireless communication device to the second wireless communication device.

17. The method of claim 15, comprising:
calculating, using the received predicted spatial data, a prediction of beam forming antenna weights for use in controlling a shape of at least one antenna beam in the first wireless communication device.

18. The method of claim 17, wherein the iterative process further comprises receiving, from the node, predicted spatial data relating to a second wireless communication device, and wherein the calculation of a prediction of beam forming antenna weights comprises calculating, using the received predicted spatial data relating to a second wireless communication device, a prediction of beam forming antenna weights for use in controlling a direction of at least one antenna beam to point in a direction from the first wireless communication device to the second wireless communication device; the method further comprising:
calculating an uncertainty metric that indicates a weighted sum of an angular velocity of direction to the node as seen from the first wireless communication device and an angular velocity of orientation of the first wireless communication device,
mapping the calculated uncertainty metric to a beam shape metric, and
wherein the calculation of the beam forming antenna weights further comprises using the beam shape metric.

19. The method of claim 17, wherein the iterative process further comprises receiving, from the node, predicted spatial data relating to a second wireless communication device, and wherein the calculation of a prediction of beam forming antenna weights comprises calculating, using the received predicted spatial data relating to a second wireless communication device, a prediction of beam forming antenna weights for use in controlling a direction of at least one antenna beam to point in a direction from the first wireless communication device to the second wireless communication device; the method further comprising:
calculating an uncertainty metric that indicates a weighted sum of an angular velocity of direction to the second wireless communication device as seen from the first wireless communication device and an angular velocity of orientation of the first wireless communication device,
mapping the calculated uncertainty metric to a beam shape metric, and
wherein the calculation of the beam forming antenna weights further comprises using the beam shape metric.

20. A node comprising radio circuitry, a processor and a memory, said memory containing instructions executable by said processor whereby said node is operative to:
receive, from a wireless communication device, spatial sensor data relating to the wireless communication device, wherein the spatial sensor data comprises any rotation data, and where the spatial sensor data are absolute values or values that are relative between the node and the first wireless communication device or a combination of said absolute and relative values,
record the received data such that a time sequence of historical and current spatial sensor data relating to the wireless communication device is maintained, and
calculate, using data of the time sequence of historical and current spatial sensor data relating to the wireless communication device, predicted spatial data relating to the first wireless communication device, for use in controlling at least one antenna beam in the wireless communication system;
calculate an uncertainty metric that indicates a weighted sum of an angular velocity of direction to the first wireless communication device as seen from the node and an angular velocity of orientation of the node;

map the calculated uncertainty metric to a beam shape metric; and calculate, using the predicted spatial data and the beam shape metric, a prediction of beam forming antenna weights for use in controlling a direction of at least one antenna beam in the node and a shape of at least one antenna beam in node, wherein the calculated prediction of beam forming antenna weights is used during the iterative process in the node for controlling an antenna beam to point in a direction from the node to the first wireless communication device.

21. A wireless communication device comprising radio circuitry, a processor and a memory, said memory containing instructions executable by said processor whereby said wireless communication device is operative to:

obtain, from at least one sensor in the wireless communication device, spatial sensor data relating to the wireless communication device, wherein the spatial sensor data comprises rotation data, and where the spatial sensor data are absolute values or values that are relative between the node and the first wireless communication device or a combination of said absolute and relative values, send, to a node in the wireless communication system, the obtained spatial sensor data relating to the wireless communication device, and calculate, using data of a time sequence of historical and current spatial sensor data relating to the wireless communication device, predicted spatial data relating to the wireless communication device, for use in controlling at least one antenna beam in the wireless communication device.

22. A wireless communication device comprising radio circuitry, a processor and a memory, said memory containing instructions executable by said processor whereby said wireless communication device is operative to:

obtain, from at least one sensor in the wireless communication device, spatial sensor data relating to the wireless communication device, wherein the spatial sensor data comprises rotation data, and where the spatial sensor data are absolute values or values that are relative between the node and the first wireless communication device or a combination of said absolute and relative values, send, to a node in the wireless communication system, the obtained spatial sensor data relating to the wireless communication device, and receive, from the node, predicted spatial data relating to the wireless communication device, for use in controlling at least one antenna beam in the wireless communication device.

23. A wireless communication system comprising a node according to claim 20 and further comprising:

a wireless communication device comprising radio circuitry, a processor and a memory, said memory containing instructions executable by said processor whereby said wireless communication device is operative to:

obtain, from at least one sensor in the wireless communication device, spatialsensor data relating to the first wireless communication device, wherein the spatial sensor data comprises rotation data, and where the spatial sensor data are absolute values or values that are relative between the node and the first wireless communication device or a combination of said absolute and relative values, send, to the node, the obtained spatial sensor data relating to the wireless communication device, and calculate, using data of a time sequence of historical and current spatial sensor data relating to the first wireless communication device, predicted spatial data for use in controlling at least one antenna beam in the wireless communication device.

24. A non-transitory computer-readable medium comprising, stored thereupon, a computer program, the computer program comprising instructions which, when executed on at least one processor of a node of a wireless communication system, cause the at least one processor to perform an iterative process, wherein the iterative process comprises:

receiving, from a first wireless communication device, spatial sensor data relating to the first wireless communication device;

recording the received spatial sensor data such that a time sequence of historical and current spatial sensor data relating to the first wireless communication device is maintained; and calculating, using data of the time sequence of historical and current spatial sensor data relating to the first wireless communication device, predicted spatial data relating to the first wireless communication device, for use in controlling at least one antenna beam in the wireless communication system;

calculating an uncertainty metric that indicates a weighted sum of an angular velocity of direction to the first wireless communication device as seen from the node and an angular velocity of orientation of the node;

mapping the calculated uncertainty metric to a beam shape metric; and calculating, using the predicted spatial data and the beam shape metric, a prediction of beam forming antenna weights for use in controlling a direction of at least one antenna beam in the node and a shape of at least one antenna beam in node, wherein the calculated prediction of beam forming antenna weights is used during the iterative process in the node for controlling an antenna beam to point in a direction from the node to the first wireless communication device;

wherein the spatial sensor data comprises rotation data, and where the spatial sensor data are absolute values or values that are relative between the node and the first wireless communication device or a combination of said absolute and relative values.

25. A wireless communication system comprising a node according to claim 20 and further comprising:

a wireless communication device comprising radio circuitry, a processor and a memory, said memory containing instructions executable by said processor whereby said wireless communication device is operative to:

obtain, from at least one sensor in the wireless communication device, spatial sensor data relating to the wireless communication device, wherein the spatial sensor data comprises rotation data, and where the spatial sensor data are absolute values or values that are relative between the node and the first wireless communication device or a combination of said absolute and relative values send, to the node, the obtained spatial sensor data relating to the wireless communication device, and receive, from the node, predicted spatial data, for use in controlling at least one antenna beam in the wireless communication device.

26. The method of claim 10, further comprising:

calculating an uncertainty metric that indicates a weighted sum of an angular velocity of direction to the node as seen from the first wireless communication device and an angular velocity of orientation of the first wireless communication device;

mapping the calculated uncertainty metric to a beam shape metric; and calculating, using the predicted spatial data and the beam shape metric, a prediction of beam forming antenna weights for use in controlling a direction of at least one antenna beam in the first wireless communication device and a shape of at least one antenna beam in the first wireless communication device, wherein the calculated prediction of beam forming antenna weights is used during the iterative process in the node for controlling an antenna beam to point in a direction from the node to the first wireless communication device.

* * * * *